United States Patent [19]

Imamura

[11] 4,337,426

[45] Jun. 29, 1982

[54] STABILIZED SERVO MOTOR POSITIONING APPARATUS

[75] Inventor: Tomoatsu Imamura, Tokyo, Japan

[73] Assignee: Ricoh Co., Ltd., Tokyo, Japan

[21] Appl. No.: 182,174

[22] Filed: Aug. 28, 1980

[30] Foreign Application Priority Data

Aug. 31, 1979 [JP] Japan .................................. 54/111280
Oct. 13, 1979 [JP] Japan .................................. 54/132183
Oct. 13, 1979 [JP] Japan .................................. 54/132184

[51] Int. Cl.³ .......................................... G05B 11/28
[52] U.S. Cl. ................................... 318/599; 318/616; 318/681; 318/684; 318/432
[58] Field of Search ........................ 318/599, 616–618, 318/677, 678, 681, 684, 341, 432

[56] References Cited

U.S. PATENT DOCUMENTS 3,551,747 12/1970 Joslyn ........................... 318/599 UX
4,260,936 4/1981 Sun ..................................... 318/599

Primary Examiner—J. V. Truhe
Assistant Examiner—Eugene S. Indyk
Attorney, Agent, or Firm—David G. Alexander

[57] ABSTRACT

A photoelectric transducer (14) produces first and second periodic signals (A), (B) which are 90° out of phase with each other in response to rotation of a servo motor shaft (12a). The first and second signals (A), (B) are differentiated, directly full wave rectified and summed to produce a velocity signal (Vw−) having a magnitude proportional to the rotational velocity of the shaft (12a). The peaks of the first and second signals (A), (B) are detected to produce a reference signal (Vr) having a magnitude corresponding thereto. The magnitude of the reference signal (Vr) is reduced in accordance with the difference between the present position of the shaft (12a) and a command position to produce a velocity command signal (Vc+). The velocity signal (Vw−) is compared with the velocity command signal (Vc+), to produce a drive signal corresponding to the difference therebetween which is applied to the motor (12). Fluctuations in the amplitude, D. C. component and phase of the first and second signals (A), (B) affect the reference signal (Vr) and the velocity signal (Vw−) equally and are thereby cancelled out. The reference signal Vr is also applied to compensate the signals (A) and (B) for variations in phase and the like to produce accurate position pulses. A drive means (27) for the motor (12) includes a hybrid chopper and dropper amplifier and means for eliminating audible chopper sound.

6 Claims, 11 Drawing Figures

| Fig. 2 | |
|---|---|
| Fig. 2A | Fig. 2B |

STABILIZED SERVO MOTOR POSITIONING APPARATUS

BACKGROUND OF THE INVENTION

The present invention relates to servo motor positioning system which may be used in any application in which it is required to accurately move a rotational load from a present position to a desired or command position.

An appparatus for producing an actual motor shaft angular velocity signal for use in such a system is disclosed in U.S. Pat. No. 3,819,268 entitled "VELOCITY DETERMINATION WITH OPTOELECTRONIC LINEAR POSITION TRANSDUCER". In one embodiment of this prior art apparatus a photoelectric transducer produces first and second periodic signals which are 90° out of phase with each other in response to rotation of a servo motor shaft. The first and second signals are differentiated, full wave rectified and summed to produce a velocity signal having a magnitude proportional to the rotational velocity of the shaft. Full wave rectification is accommplished using gating signals derived from either the first and second signals or the differentiated versions thereof by means of voltage comparators.

This system is clearly advantageous over yet prior systems in which position signals are produced by a photoelectric transducer and a velocity signal is produced by a tachometer since the mechanical inertia of the components driven by the motor shaft is reduced and the response time is decreased. Also, the high cost of an electromagnetic tachometer is eliminated since the tachometer is replaced by low cost electronic circuitry.

The velocity signal produced in this manner is utilized in a servo positioning system by comparing the velocity signal with a velocity command signal which corresponds to the present angular distance between the actual motor shaft position and the command position. The difference between the velocity and velocity command signals is sensed to produce a difference signal which is applied to the motor.

While such a system is advantageously operable and provides generally acceptable service, the precision of operation thereof has been heretofore limited. The main problem involved is that the magnitude of the velocity signal is subject to variation in response to changes in the A.C. amplitude, D.C. component level and phase of the first and second signals produced by the transducer.

This problem is compounded by the voltage comparators used to produce the gating signals which typically comprise Schmitt trigger circuits. This is because the magnitude of the velocity signal is influenced not only directly as mentioned above but also indirectly since variations in the first and second signals also affect the relative trigger points in the comparators. Position errors are also produced since the first and second signals are used as position pulses and the leading edges thereof are subject to phase errors.

The difference or error signal applied to the motor is amplified by a servo amplifier. D.C. servo amplifiers known heretofore may be classified, according to amplification system, into a dropper type which performs continuous energization of the motor and a chopper type which performs intermittent energization of the motor. With regard to the type of switching system, D.C. servo amplifiers may be classified into a T type comprising two main switching elements and an H type comprising four main switching elements.

Each of the above described types of servo amplifiers have advantages and disadvantages. The H type is utilized where it is desired to drive the motor with low power and high speed. In a conventional chopper amplifier, the chopper frequency varies in accordance with the motor current and at very low current values may drop to such a low value as to be audible. In the prior art it has been necessary to use a special motor which does not have clicks and which is de-energized in the static or detent range. A conventional motor when so de-energized to stop the noise produced by the oscillation cannot enable accurate position control.

Another problem in D.C. servo motors is that counter EMF developed in the motor causes fluctuation of the power supply voltage upon reversal of the motor.

SUMMARY OF THE INVENTION

A servo positioning apparatus embodying the present invention includes a servo motor having a rotary shaft, transducer means for producing periodic signals in response to rotation of the shaft and computing means responsive to the periodic signals for computing a difference between a command motor shaft speed and an actual motor shaft speed and generating an error signal corresponding thereto, and is characterized by comprising drive means connected between the computing means and the motor for driving the motor in accordance with the error signal, the drive means comprising a first servo amplifier, a second servo amplifier, the servo motor being connected between outputs of the first and second servo amplifiers, an operational amplifier having a non-inverting input connected to the computing means for receiving the error signal, an inverting input connected to the output of the first servo amplifier and an output connected to an input of the first servo amplifier, current sensor means connected between the motor and the second servo amplifier for sensing motor current, Schmitt trigger means having a non-inverting input connected to an output of the current sensor and Miller integrator means having an input connected to an output of the Schmitt trigger means and an output connected to an inverting input of the Schmitt trigger means and to an input of the second servo amplifier, the Miller integrator means generating a sawtooth signal.

In accordance with the present invention, a photoelectric transducer produces first and second periodic signals which are 90° out of phase with each other in response to rotation of a servo motor shaft. The first and second signals are differentiated, directly full wave rectified and summed to produce a velocity signal having a magnitude proportional to the rotational velocity of the shaft. The peaks of the first and second signals are detected to produce a reference signal having a magnitude corresponding thereto. The magnitude of the reference signal is reduced in accordance with the difference between the present position of the shaft and a command position to produce a velocity command signal. The velocity signal is compared with the velocity command signal to produce a drive signal corresponding to the difference therebetween which is applied to the motor. Fluctuations in the amplitude, D.C. component and phase of the first and second signals affect the reference signal and the velocity signal equally and are thereby cancelled out. The reference signal is also applied to compensate the signals and for variations in phase and the like to produce accurate position pulses.

A drive means for the motor includes a hybrid chopper and dropper amplifier and means for eliminating audible chopper sound.

It is an object of the present invention to provide an improved servo positioning apparatus which overcomes the drawbacks of the prior art and enables extremely accurate position control compared to the prior art.

It is another object of the present invention to provide an improved servo positioning apparatus comprising a D.C. servo amplifier operating on the chopper principle which eliminates audible chopper sound and voltage fluctuation of the power supply.

It is another object of the present invention to provide a generally improved servo positioning apparatus.

Other objects, together with the foregoing, are attained in the embodiments described in the following description and illustrated in the accompanying drawing.

BRIEF DESCRIPTION OF THE DRAWING

FIG. 2 is a diagram showing how

FIGS. 2A–2B are detailed electrical schematic diagrams of part of the apparatus;

DESCRIPTION OF THE PREFERRED EMBODIMENTS

While the servo positioning apparatus of the present invention is susceptible of numerous physical embodiments, depending upon the environment and requirements of use, substantial numbers of the herein shown and described embodiments have been made, tested and used, and all have performed in an eminently satisfactory manner.

Figure 1:
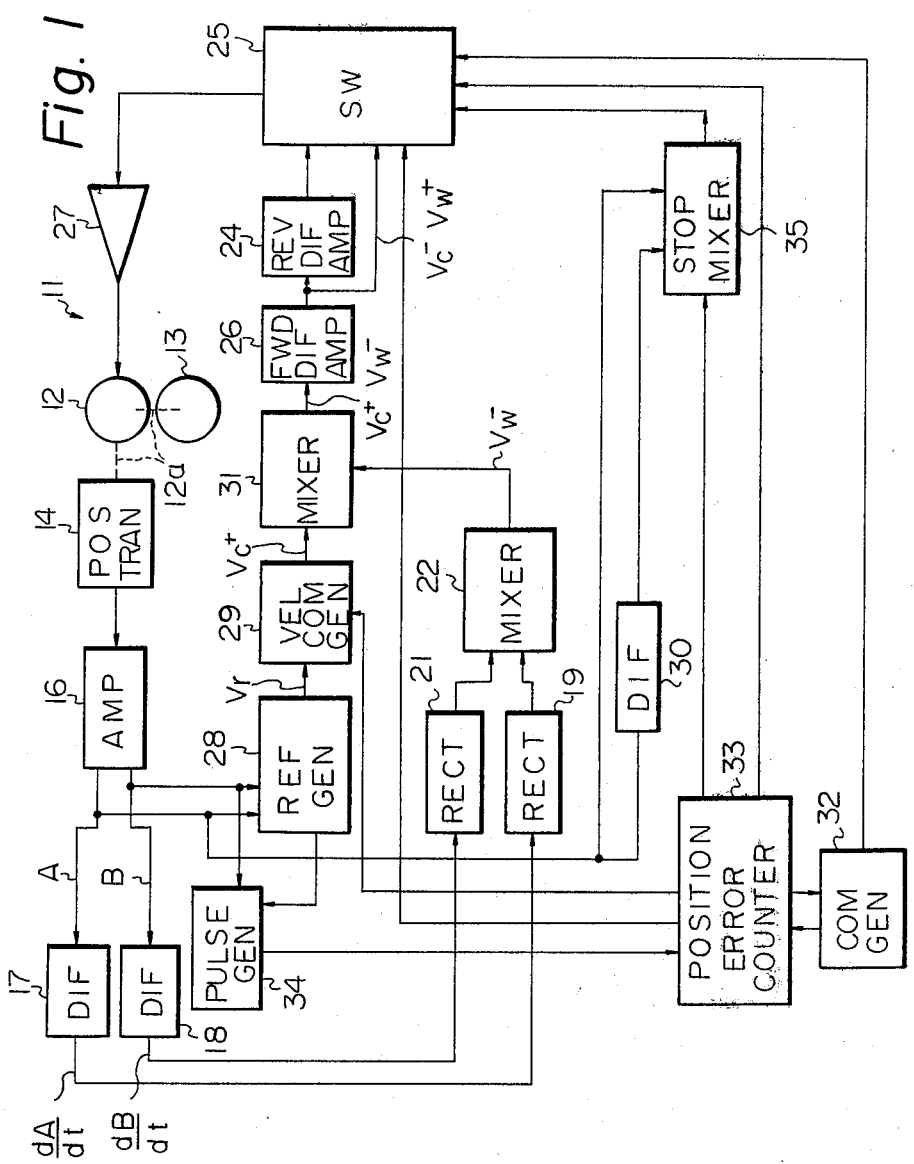
FIG. 1 is a block diagram of a servo positioning apparatus embodying the present invention.

Referring now to FIG. 1 of the drawing, a stabilized servo positioning apparatus embodying the present invention is generally designated by the reference numeral 11 and comprises a servo motor 12. The servo motor 12 has a rotary shaft 12a which is connected to drive a load 13. The shaft 12a is also connected to position signal transducer 14 which is typically of the photoelectric type. Although not illustrated in detail, the transducer 14 generally comprises a disc mounted on the shaft 12a for integral rotation therewith. The disc is opaque and formed with a plurality of circumferentially spaced transparent or translucent slots. A light source and two photosensors are fixedly mounted on opposite sides of the disc so that light from the light source passing through the slots of the disc is incident on the photosensors. Upon rotation of the shaft 12a and disc, the photosensors are alternately uncovered by the slots and covered by the areas between the slots to generate periodic position signals upon rotation of the disc. The photosensors are mounted in a circumferentially spaced manner such that the position signals are generated 90° out of phase with each other. The waveforms of the position signals, designated as A and B in the drawing, may be sinusoidal, sawtooth, triangular or any other desired shape.

The signals A and B are fed through an amplifier 16 to differentiators 17 and 18 which differentiate the signals A and B to produce differentiated signals $dA/dt$ and $dB/dt$ respectively. Whereas the amplitudes of the signals A and B are constant at all angular rotational speeds of the shaft 12a, the amplitudes of the signals $dA/dt$ and $dB/dt$ are proportional to the rotational speed.

Figure 4:
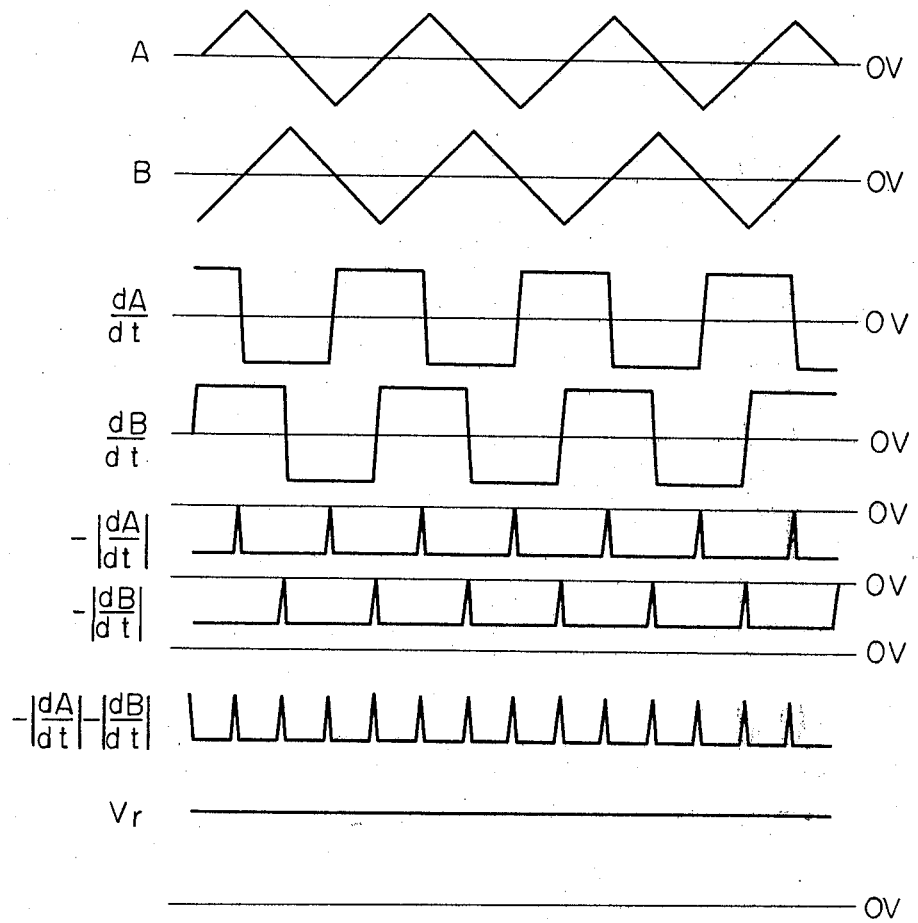
FIGS. 4 and 5 are graphs illustrating the operation of the apparatus.

The signals $dA/dt$ and $dB/dt$ are fed through full wave rectifiers 19 and 21 to a mixer 22 which adds or sums the rectified signals. As illustrated in FIG. 4, the output voltage of the mixer 22 will never be zero since the two full wave rectified signals are summed with each other and there is no point at which both full wave rectified signals are simultaneously zero.

The output of the mixer 22 is designated as $Vw-$ and constitutes an actual velocity signal which is fed to an adder or mixer 31.

The velocity signal $Vw-$ appears as a ripple signal having peak and average values proportional in magnitude to the actual angular velocity of the shaft 12a.

Due to the fact that the half cycles of the signals $dA/dt$ and $dB/dt$ are effectively added together at intervals of 45°, the average value of the signal $Vw-$ is larger in magnitude than the ripple component. This makes the signal $Vw-$ advantageous for use as a velocity signal in the apparatus 11. It will be further noted that the signals $dA/dt$ and $dB/dt$ are directly full wave rectified by the rectifiers 19 and 21, which may comprise diode bridges or the like.

The output of the mixer 31 is fed to a forward differential amplifier 26, the output of which is connected to a reverse differential amplifier 24. The outputs of the amplifiers 24 and 26 are selectively connectable through a switch 25 and amplifier 27 to the motor 12 as will be described in detail below.

The signals A and B are also fed to a reference signal generator 28 which samples the peaks of the signals A and B and produces a reference signal Vr having a magnitude corresponding thereto. The reference signal Vr from the generator 28 is fed to a velocity command signal generator 29. The output of the generator 29 constitutes a velocity command signal $Vc+$ which is fed to the mixer 31. The mixer 31 produces a signal $Vc+ Vw-$ which is fed to the amplifier 26.

The distance between the present position of the shaft 12a and the command or desired future position thereof is set into a command signal generator 32. The generator 32 is connected to a position error counter 33 which counts the number of steps from the present position to the command position. A pulse generator 34 generates pulses in response to the signals A and B which are fed to the counter 33 to decrement the same. Outputs of the counter 33 are connected to the velocity command signal generator 29 and a stop mixer 35. The mixer 35 is also connected to receive the signals A and $dA/dt$, the latter by means of a differentiator 30. Outputs of the command signal generator 32 and amplifier 35 are connected to inputs of the switch 25.

In operation, the desired distance for rotation of the shaft 12a is set into the generator 32 and therefrom into the counter 33. The generator 32 further generates a signal indicating forward or reverse rotation which is fed to the switch 25. For forward rotation the command signal generator 32 controls the switch 25 to select the output of the amplifier 26. For reverse rotation the generator 32 controls the switch 25 to select the output of the amplifier 24.

Figure 5:
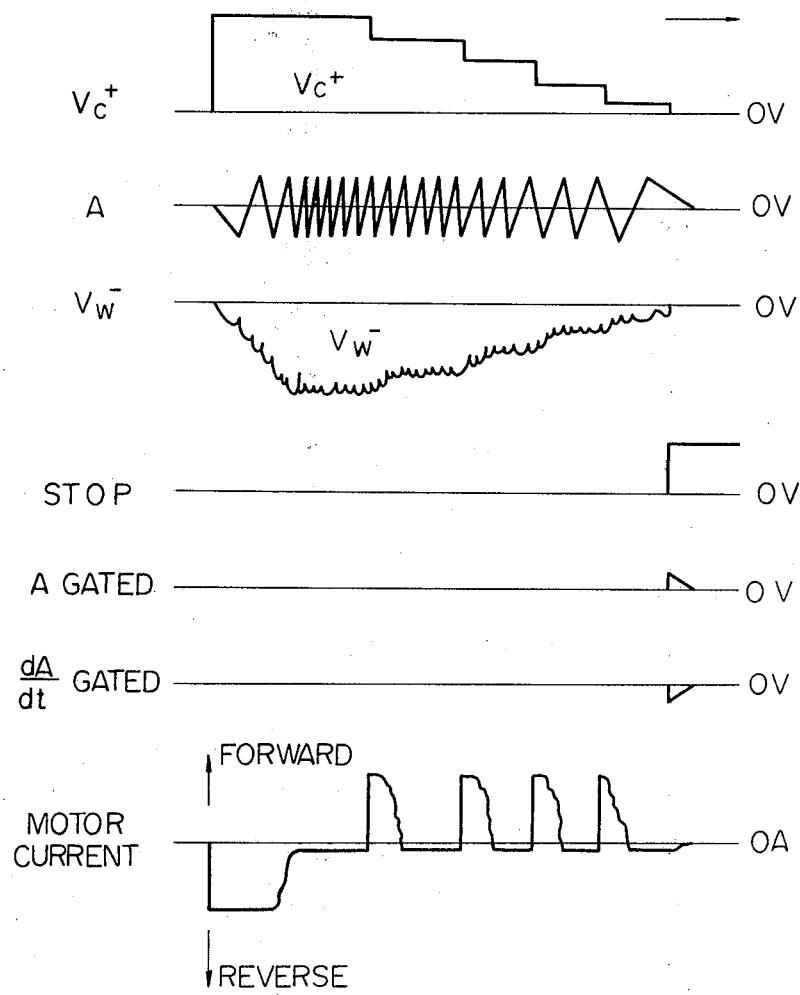

With reference being made to FIG. 5, and assuming forward rotation, it will be understood that the amplifier 26 is selected and that the number of steps for rotation of the shaft 12a is set into the counter 33. The output of the counter 33 is fed to the velocity command generator 29 which generates the velocity signal Vc+ as a function of the distance of the motor shaft 12a from the present position to the command position. The larger the distances the larger the magnitude of the velocity command signal Vc+. In other words, the magnitude of the velocity command signal Vc+ is progressively reduced as the shaft 12a approaches the command position.

The mixer 31 functions to sum the signals Vc+ and Vw−. As described hereinabove the signals A and B are differentiated, rectified and summed to produce the actual velocity signal Vw−. The magnitude of the signal Vw− (peak or average value) is proportional to the actual velocity of the shaft 12a. The signal Vw− is algebraically added to the signal Vc+ by the mixer 31 and a motor drive or error signal Vc+ Vw− proportional to the difference between the signals Vw− and Vc+ applied to the motor 12 through the amplifier 27. The motor current is proportional to the magnitude of the drive signal Vc+ Vw−.

The polarity of the signal Vw− is negative whereas the polarity of the signal Vc+ is positive. When the actual velocity equals the command velocity the signals Vw− and Vc+ will be equal in magnitude and will cancel to produce a zero drive signal. At the beginning of movement of the shaft 12a the actual velocity is zero and the command velocity is high. Thus, the signal Vc+ will have a high value and the amplifier 26 will produce a large positive signal for driving the motor shaft 12a in the forward direction. As the shaft speed increases and overshoots the command speed, the signal Vw− will be larger than the signal Vc+ and the amplifier 26 will produce a negative signal to energize the motor 12 in the reverse direction and decelerate the shaft 12a. These operations are illustrated in FIG. 5.

For reverse rotation the switch 25 selects the inverted output of the amplifier 24 which is Vc− Vw+.

The generator 34 produces position pulses derived from the signals A and B. One position pulse is generated for each angular rotational step of the shaft 12a and decrements the counter 33. The progressively decreasing count in the counter 33 causes the magnitude of the signal Vc+ to decrease thereby progressively commanding a lower shaft speed.

When the shaft 12a is within a small distance from the command position the counter 33 generates a stop signal for selecting the mixer 35. In response to the stop signal the signals A and dA/dt are algebraically added together and gated through the mixer 35 to the motor 12 via the switch 25 and amplifier 27. This has the effect of braking the shaft 12a to a stop in exactly the command position.

As will be understood from further description, the reference signal generator 28 samples the peaks of the signals A and B and produces the reference signal Vr which corresponds thereto. Any variations in the signals A and B affect the reference signal Vr and thereby the command velocity signal Vc+ in the same manner as the actual velocity signal Vw−. Thus, such fluctuations are automatically cancelled out and do not affect the operation of the apparatus 11. This enables a substantial increase in the stability and precision of operation of the apparatus 11 over the prior art.

Figure 2A:
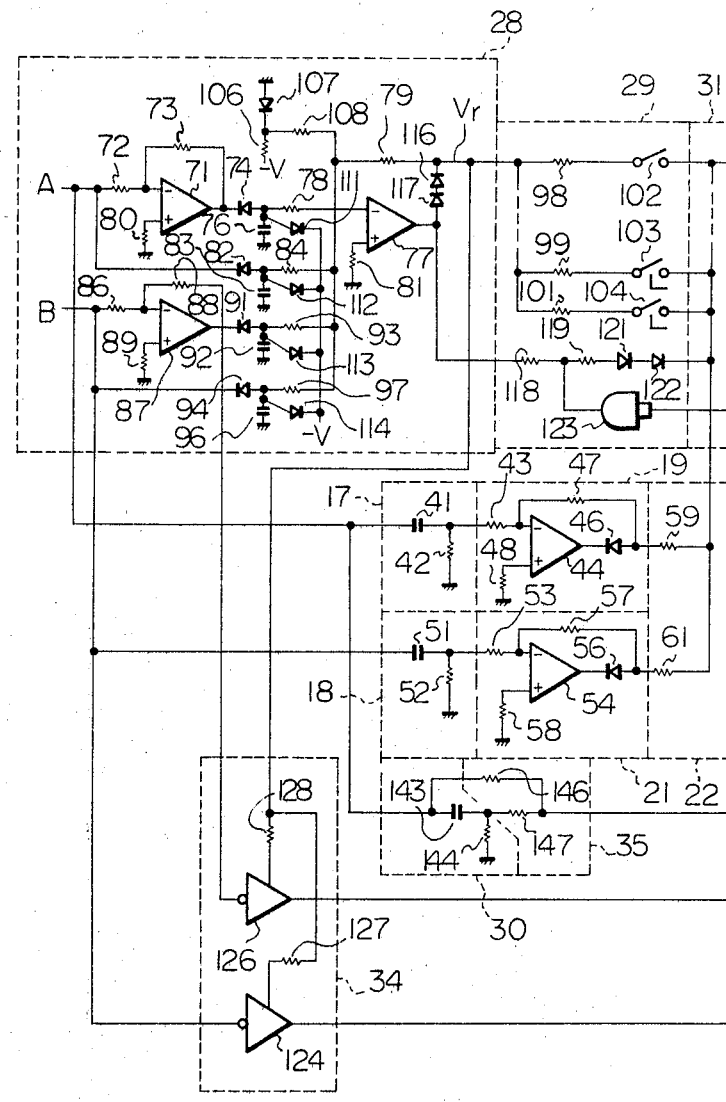
FIGS. 2A–2B are to be connected.
Figure 2B:
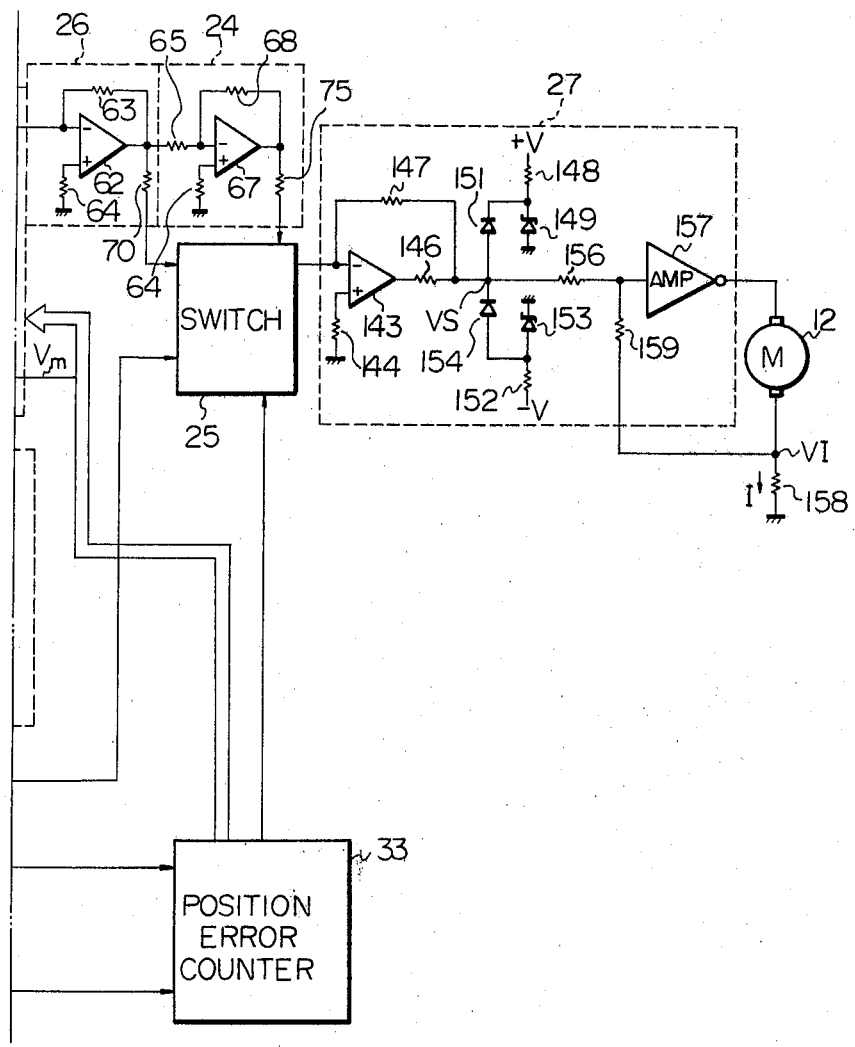

Referring now to FIG. 2 it will be seen that the differentiator 17 comprises a capacitor 41. One end of the capacitor 41 is connected to receive the signal A and the other end of the capacitor 41 is grounded through a resistor 42. The junction of the capacitor 41 and resistor 42 is connected through an input resistor 43 to the inverting input of an operational amplifier 44 of the rectifier 19. The output of the operational amplifier 44 is connected to the cathode of a diode 46, the anode of which is connected through a feedback resistor 47 to the inverting input of the amplifier 44. The non-inverting input of the operational amplifier 44 is grounded through a resistor 48.

The differentiator 18 comprises a capacitor 51 connected at one end thereof to receive the signal B. The other end of the capacitor 51 is grounded through a resistor 52. The junction of the capacitor 51 and resistor 52 is connected through an input resistor 53 to the inverting input of an operational amplifier 54 of the rectifier 21. The output of the operational amplifier 54 is connected to the cathode of a diode 56, the anode of which is connected through a feedback resistor 57 to the inverting input of the operational amplifier 54. The non-inverting input of the operational amplifier 54 is connected to ground through a resistor 58.

The cathodes of the diodes 46 and 56 are connected through resistors 59 and 61 of the mixer 22 to the inverting input of an operational amplifier 62 of the amplifier 26. The output of the operational amplifier 62 is connected to the inverting input thereof through a feedback resistor 63. The non-inverting input of the operational amplifier 62 is grounded through a resistor 64.

The output of the operational amplifier 62 is fed through a resistor 65 to the inverting input of an operational amplifier 67. The output of the operational amplifier 67 is connected to the inverting input thereof through a feedback resistor 68. The non-inverting input of the operational amplifier 67 is grounded through a resistor 69. The outputs of the amplifiers 62 and 67 are connected to the switch 25 through resistors 70 and 75 respectively.

The signal A is differentiated by the differentiator 17 in a known manner. During the positive half cycles of the differentiated signal A the operational amplifier 44 produces a negative output which reverse biases the diode 46. This has the effect of disconnecting the operational amplifier 44 from the rest of the circuit. The time constant Tp for differentiation of the positive half peaks of the differentiated signal A is $$Tp = C41 \left( \frac{R42 \times (R43 + R47 + R59)}{R42 + (R43 + R47 + R59)} \right)$$

where the prefix R designates the resistance value of the resistor designated by the suffixed reference numeral and C41 is the capacitance value of the capacitor C41.

During the negative half cycles of the differentiated signal A the operational amplifier 44 produces a positive output which forward biases the diode 46 and connects the operational amplifier 44 to the rest of the circuit. The time constant Tn for differentiation of the negative half cycles of the signal A is $$Tn = C41 \left( \frac{R42 \times R43}{R42 + R43} \right)$$

and the amplification factor of the operational amplifier 44 is R47/R43. In this manner the signal A is differentiated and full wave rectified and applied to the operational amplifier 62 through the resistor 59. The signal B is differentiated and full wave rectified in an identical manner by the differentiator 18 and rectifier 21 and applied to the operational amplifier 62 through the resistor 61. The operational amplifier 62 is connected as a summing amplifier and sums the signals at its inverting input. The output of the operational amplifier 62 is inverted by the operational amplifier 67.

The reference signal generator 28 comprises an operational amplifier 71. The signal A is fed through an input resistor 72 to the inverting input of the operational amplifier 71. The output of the operational amplifier 71 is connected to the inverting input thereof through a feedback resistor 73. The non-inverting input of the operational amplifier 71 is grounded through a resistor 80. The output of the operational amplifier 71 is connected to the cathode of a diode 74, the anode of which is grounded through a capacitor 76. The anode of the diode 74 is also connected to the inverting input of an operational amplifier 77 through an input resistor 78. The output of the operational amplifier 77 is connected through a feedback resistor 79 to the inverting input thereof. The non-inverting input of the operational amplifier 77 is connected through a resistor 81 to ground.

The signal A is also applied to the cathode of a diode 82, the anode of which is connected to ground through a capacitor 83. The anode of the diode 82 is also connected to the inverting input of the operational amplifier 77 through an input resistor 84.

The signal B is fed through an input resistor 86 to the inverting input of an operational amplifier 87. The output of the operational amplifier 87 is connected to the inverting input thereof through a feedback resistor 88. The non-inverting input of the operational amplifier 87 is grounded through a resistor 89. The output of the operational amplifier 87 is connected to the cathode of a diode 91, the anode of which is grounded through a capacitor 92. The anode of the diode 91 is also connected to the inverting input of the operational amplifier 77 through an input resistor 93.

The signal B is also applied to the cathode of a diode 94, the anode of which is connected to ground through a capacitor 96. The anode of the diode 94 is also connected to the inverting input of the operational amplifier 77 through an input resistor 97.

The output of the operational amplifier 77 is connected through resistors 98, 99 and 101 and switches 102, 103 and 104 which are connected in series with the resistors 98, 99 and 101 respectively to the inverting input of the operational amplifier 62. The mixer 31 is constituted by the hard wired connection of the outputs of the generator 29 and mixer 22.

The signals A and B are half wave rectified by the diodes 82 and 94 and charge the capacitors 83 and 96 respectively. The capacitors 83 and 96 charge up to the negative peaks of the rectified signals A and B respectively. The signals A and B are inverted by the operational amplifiers 71 and 87 and half wave rectified by the diodes 74 and 91 respectively. The inverted and rectified signals A and B charge the capacitors 76 and 92 respectively. More specifically, the capacitors 76 and 92 charge to the negative peaks of the output signals of the operational amplifiers 71 and 87 which correspond to the positive peaks of the signals A and B respectively. Preferably, the values of the resistors 72, 73, 86 and 88 are equal so that the operational amplifiers 71 and 87 are operated at an amplification factor of unity.

The operational amplifier 77 is operated as an inverting summing amplifier and sums the signals applied thereto through the resistors 78, 84, 93 and 97. It will be understood that the diodes and capacitors 74, 76; 82, 83; 91, 92; and 94, 96 function as peak detectors since the capacitors 76, 83, 92 and 96 charge to the peaks of the applied signals.

The operational amplifier 77 produces the reference signal Vr which has the following magnitude $$Vr = -\left( \overline{A} \frac{R79}{R78} + A \frac{R79}{R84} + \overline{B} \frac{R79}{R93} + B \frac{R79}{R97} \right)$$

where $\overline{A}$, A, $\overline{B}$ and B are the signals applied to the inverting input of the operational amplifier 77 through the diodes 74, 82, 91 and 94 respectively. The signals $\overline{A}$, A, $\overline{B}$ and B are negatively half wave rectified by the diodes 74, 82, 91 and 94 respectively, and portions of the signal voltages are dropped across the respective diodes. The combination of the diode 107 and resistor 106 compensate for the voltage drops.

The magnitude of the reference signal Vr is an average value of the peak signals where R78=R84=R93=R97 and R79=(¼)R78. The signal Vr reflects any variations in the signals A and B in the manner described above.

The switches 102, 103 and 104 are controlled by the counter 33. More than three switches may be provided in series with appropriate resistors although only three sets are illustrated. When the actual shaft position is far from the command position the counter 33 closes all of the switches 102, 103 and 104 to connect all of the resistors 98, 99 and 101 in parallel between the output of the operational amplifier 77 and the input of the operational amplifier 62. In this case, the input resistance of the operational amplifier 62 is minimum and the amplification factor thereof is maximum. Thus, the reference signal is amplified by a maximum amount by the operational amplifier 62 to produce a maximum velocity command signal.

As the motor shaft 12a approaches the command position the counter 33 opens the switches 102, 103 and 104 one by one until at the command position all of the switches 102, 103 and 104 are open. The input resistance of the operational amplifier 62 progressively increases and the amplification factor thereof decreases. Thus, the reference signal is amplified by the operational amplifier 62 to a progressively smaller extent and the magnitude of the signal Vc+ progressively decreases. With all of the switches 102, 103 and 104 open the input resistance of the operational amplifier 62 is infinite and the output thereof is zero.

Although the switches 102, 103 and 104 are illustrated as being mechanical and being controlled directly by the counter 33, this is only for simplicity of illustration and description. In an actual embodiment the switches 102, 103 and 104 are constituted by electronic switches and suitable logical circuitry provided between the counter 33 and switches 102, 103 and 104 for actuating the same.

Further illustrated are a resistor 106 and a diode 107 connected in series between a source $-V$ and ground. The junction of the resistor 106 and diode 107 is connected through a resistor 108 to the inverting input of the operational amplifier 77. The voltage generated across the diode 107 compensates for temperature drift in the diodes 74, 82, 91 and 94.

Diodes 111 to 114 are connected between the source $-V$ and the capacitors 76, 83, 92 and 96 to prevent discharge thereof during static conditions of the motor 12.

Diodes 116 and 117 are connected in series between the output of the operational amplifier 77 and the resistor 79. Resistors 118 and 119 and diodes 121 and 122 are connected in series between the output of the operational amplifier 77 and the inverting input of the operational amplifier 62. The output of an AND gate 123 is connected to the junction of the resistors 118 and 119. Both inputs of the AND gate 123 are connected to receive a minimum command velocity signal Vm from the counter 33. The elements described hereinabove function to apply a stable minimum velocity signal to the generator 29.

When the signal Vm is high, the AND gate 123 produces a high output which is applied to the generator 29 as the minimum velocity signal. The diodes 121 and 122 serve to prevent current leakage by absorbing the output voltage of the AND gate 123 when the output voltage of the AND gate 123 is low. The diodes 116 and 117 serve to compensate for temperature drift in the diodes 121 and 122 when the output voltage of the AND gate 123 is high. The resistor 118 compensates for temperature drift in the AND gate 123 when the output voltage thereof is high by dissipating output current.

The signals B and $\bar{B}$ are applied to inverting inputs of Schmitt triggers 124 and 126 respectively, the outputs of which are applied as position pulses to the position error counter 33. The reference voltage Vr is applied to reference voltage inputs of the Schmitt triggers 124 and 126 through resistors 127 and 128 respectively. The outputs of the Schmitt triggers 124 and 126 will be high when the respective signals B and $\bar{B}$ are higher in magnitude than the reference signal Vr. This arrangement produces very clean position pulses which are uneffected by variations in the amplitude of the signal B since the magnitude of the reference signal Vr increases with the magnitude of the signal B.

Figure 3:
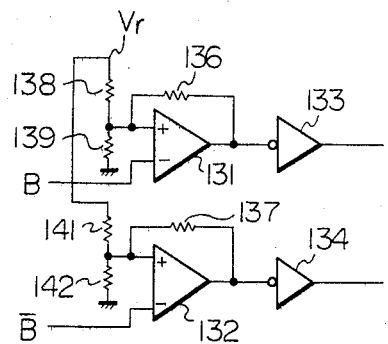
FIG. 3 is a fragmentary electrical schematic diagram illustrating an alternative form of the apparatus.

An alternative arrangement is shown in FIG. 3 in which the Schmitt triggers 124 and 126 are replaced by discrete components which produce an equivalent function. The signals B and $\bar{B}$ are applied to inverting inputs of operational amplifiers 131 and 132 respectively, the outputs of which are connected to inverters 133 and 134. Hysterisis is provided by feedback resistors 136 and 137. The reference voltage Vr is applied to the non-inverting inputs of the operational amplifiers 131 and 132 by voltage dividers consisting of resistors 138, 139, 141 and 142.

The differentiator 30 comprises a capacitor 143 and resistor 144. The mixer 35 comprises resistors 146 and 147 which sum at their junction the signals A and (dA/dt) respectively. The magnitude of the differentiated signal (dA/dt) is dropped by the resistors 144 and 147 by the ratio $$\frac{R144 \times R147}{R144 + R147}.$$

The amplifier 27 comprises an operational amplifier 143 having an inverting input connected to the switch 25 and a non-inverting input which is grounded through a resistor 144. The output of the amplifier 143 is connected to the inverting input thereof through resistors 146 and 147. A constant voltage clamp circuit consisting of a resistor 148 and Zener diode 149 connected in series between a source $+V$ and ground and a diode 151 limit the output of the amplifier 143 to a predetermined positive value which is equal to the zener voltage of the diode 149. A similar clamp circuit consisting of a resistor 152, Zener diode 153 and diode 154 limits the output of the amplifier 143 to a predetermined negative voltage which is equal to the zener voltage of the diode 153.

The junction of the resistors 146 and 147 is connected through a resistor 156 to the input of a driver amplifier 157. The output of the amplifier 157 is connected to ground through the motor 12 and a current sensing resistor 158. The junction of the motor 12 and resistor 158 is connected through a resistor 159 to the input of the amplifier 157.

The amplifier 157 has a very large input inpedance, and for this reason, $VS/R156 = VI/R159 = I \times R158$ where VS is the voltage at the junction of the resistors 146 and 147, VI is the voltage across the resistor 158 and I is the current through the resistor 158. This provides stable control of the motor 12.

Although FIG. 2 illustrates a T type motor drive, the present invention is also applicable to an H type motor drive comprising a current sensing resistor connected in series with the motor 12 and a constant current circuit comprising a Zener diode connected in parallel with a feedback resistor of an operational amplifier.

A positioning control system of the present type drives a servo motor by amplifying an error signal indicative of the difference between a command velocity signal and an actual velocity signal and thereby causes a movable member connected with the servo motor to start and stop smoothly. In this system, the overall function is effected by the performance of an amplifier at the final stage which constitutes a servo motor drive circuit, i.e. DC servo amplifier. DC servo amplifiers of this type may generally be classified into, with respect to the voltage application system, a dropper type applied with a voltage continuously and a chopper type applied with a voltage intermittently and, with respect to the construction of switching elements, a T type using two switching elements and an H type using four switching elements. Each of the described types of DC servo amplifiers has merits and demerits. The H type chopper amplifier is predominant when it is desired to drive the motor with small power and at high speed. In a conventional chopper amplifier, however, the chopper frequency varies with the current value and, particularly, the chopper frequency decreases in the static region to produce audible sound. This has forced the use of a special motor without clicks which is de-energized in the static region (detent region). This is because an ordinary motor with clicks has its position displaced when de-energized in the static region to stop the oscillatory noise and prevents accurate position control.

Figure 6:
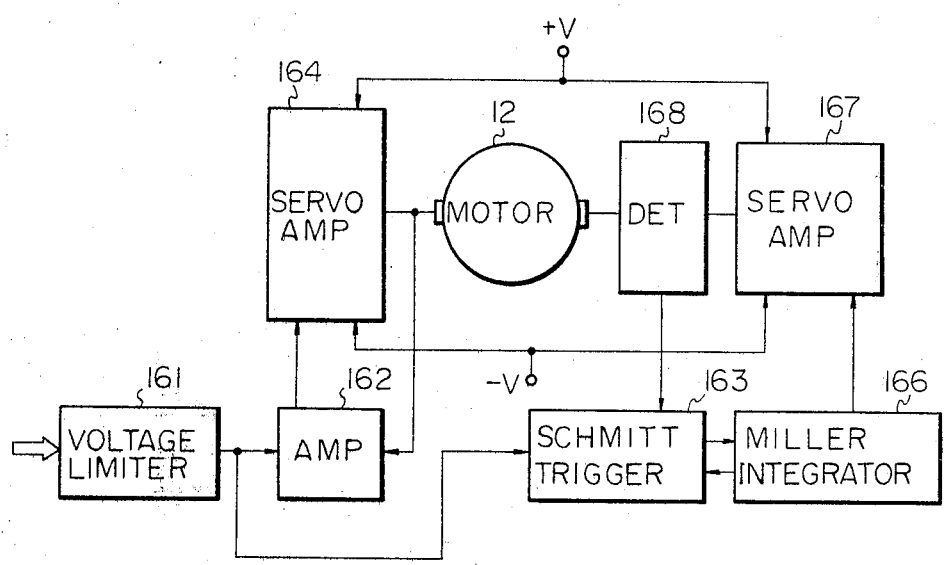
FIG. 6 is a block diagram of a servo motor drive of the apparatus.

Referring to FIG. 6, there is shown in schematic block diagram an improved amplifier according to the present invention adapted to drive a servo motor. It should be born in mind that the servo motor drive relevant with the present invention is assumed to be of the constant current drive type and, thus, limits an error signal voltage within a certain range below an upper limit and above a lower limit and feeds current back to a non-inverting Schmitt trigger circuit maintain in positive and negative maximum values of motor current constant. This promotes easy servo control and protects the servo motor itself from generation of excessive heat.

As shown in FIG. 6, a suitably amplified error signal is supplied to a voltage limiter circuit 161 which limits the error signal to a predetermined range. The limited error signal is fed from the limiter 161 to a non-inverting amplifier 162 and a non-inverting Schmitt trigger circuit 163. The output of the non-inverting amplifier 162 drives a first servo amplifier 164 whereas the output of the non-inverting Schmitt circuit 163 is fed to a Miller integrator 166 whose output in turn drives a second servo amplifier 167. Supposing that current feedback to the Schmitt circuit 163 is not provided, the output of the servo amplifier 164 and that of the servo amplifier 167 will always be opposite in polarity to each other because the Miller, integrator 166 is of the inverting type. If a motor current is detected by a current sensor or detector 168 which is connected in series between the motor 12 and amplifiers 164 and 167 and fed back to the Schmitt circuit 163, the output of the Schmitt circuit 163 will appear as a rectangular wave having positive and negative polarities depending on the sum of the error signal and current detector output, which are usually opposite in polarity. The servo amplifier 167 starts a chopper action when supplied with a sawtooth wave from the Miller integrator 166 derived from the rectangular output of the Schmitt circuit 163. Thus, the servo amplifier 164 serves to control the voltage supply and direction of current flow through the motor 12 while the servo amplifier 167 controls the magnitude of the current flowing through the motor 12 and the chopper frequency.

With a conventional H type chopper amplifier, the chopper frequency in the static region decreases down to an audible range. To avoid this, it has usually been practiced to interrupt the current supply to the motor under static conditions by using a special motor which does not stop even when the current supply thereto is cut off. In contrast, the present invention produces the chopper action at a frequency above the audible range even with a small magnitude of current under static conditions by maintaining the gain of the servo amplifier 164 relatively low and employing an oscillation circuit made up of the Schmitt circuit 163 and Miller integrator 166.

Figure 7:
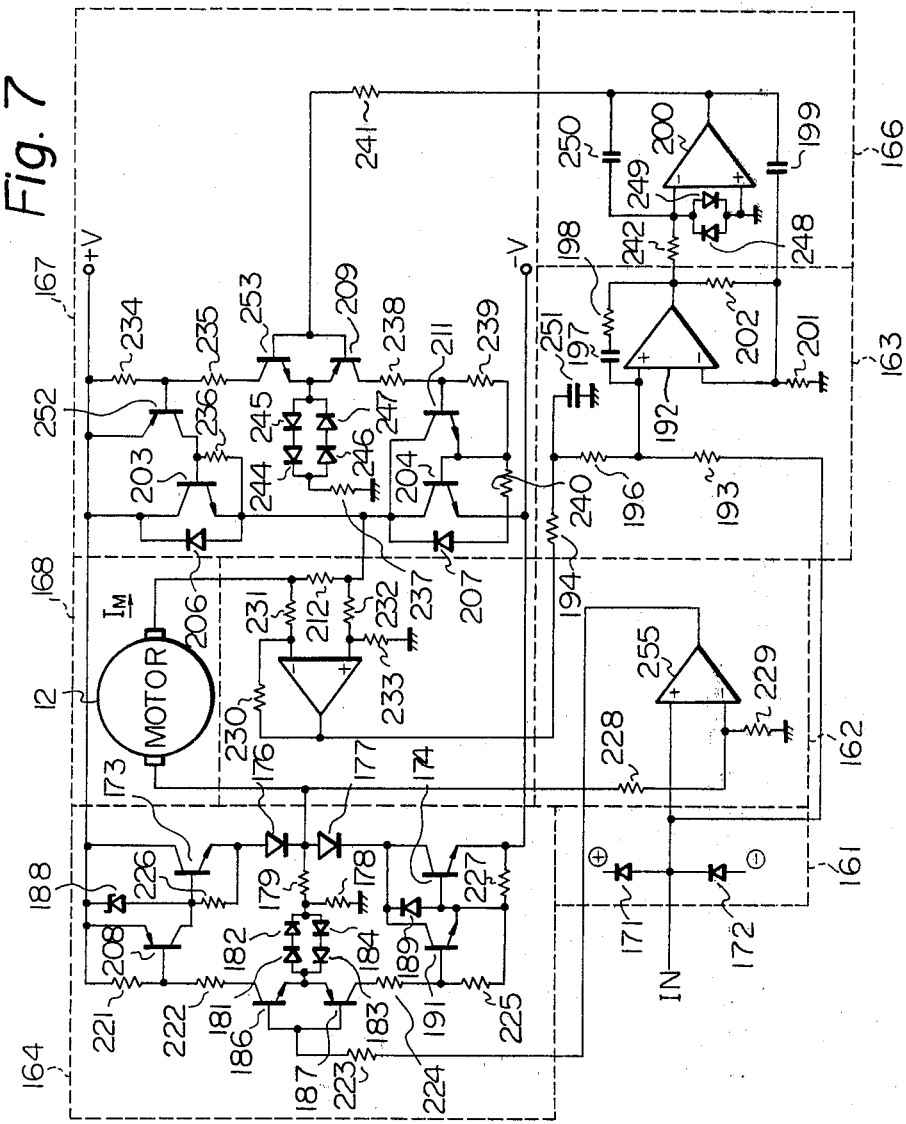
FIG. 7 is an electrical schematic diagram of the servo motor drive.

A practical example of the circuitry of FIG. 6 is shown in FIG. 7 in which the same reference numerals used in FIG. 6 denote the same blocks. An error signal fed to the voltage limiter 161 is clamped between a positive constant voltage source ⊕ and a negative constant voltage source ⊖ by diodes 171 and 172. The error signal fed through the voltage limiter 161 is applied to the non-inverting amplifier 162 whose output is in turn fed to the servo amplifier 164 comprising transistors arranged in multiple stages. Depending on its polarity, the error signal drives either one of a pair of transistors 173 and 174 at the output stage to control the direction of current fed to the motor 12. Since the error signal has been limited within a given range by the voltage limiter 161, the current flowing through the motor 12 is naturally limited to below a given level. The gain of the amplifiers 162 and 164 is suppressed to a relatively small value. This is not only to hold the chopper frequency at a high level during static operation of the motor 12 as already stated but also to preclude short-circuiting of the transistors 173 and 174 by lowering the current at the junction between diodes 176 and 177 connected in series with the transistors 173 and 174. To reduce the gain, the servo amplifier 164 has one end of a resistor 178 grounded. The other end of the resistor 178 is connected in series with diodes 181 to 184 which are connected in parallel to emitters of input transistors 186 and 187 in the opposite directions. Furthermore, a resistor 179 is connected between the junction of the diodes 176 and 177 and the junction of the diode 182 and resistor 178. The gain of the servo amplifier 164 is maintained constant by negative feedback of the potential at the junction between the diodes 176 and 177 back to the non-inverting amplifier 162. Short-circuit of the transistors 173 and 174 may effectively be prevented by defining a blind zone in an early stage of the servo amplifier 164. The diodes 181 to 184 and base-emitter current of the transistors 186 and 187 produce the blind zone in combination. Accordingly, the delay time of the transistors 173 and 174 depends on the voltage in the blind zone and the emitter current of the transistor 186.

A conventional drive circuit returns to the power source a counter voltage or EMF which develops when, for example, the direction of current flow through the motor 12 is reversed. The causes unwanted fluctuation in the power source voltage. The present invention stabilizes the power source voltage by confining the counter EMF within the servo amplifier 164. This function in FIG. 7 is provided by the diodes 176 and 177. In this instance, in view of the limited breakdown voltage of the diodes, 176 and 177, counter EMF above a given level is detected by a Zener diode 188 or 189 and dissipated by the transistor 173 or 174. Alternatively, the diodes 176 and 177 may be short-circuited to make the negative power source −V equivalent to a diode anode and connect the cathode to the base of the transistor 173 while making the positive power source +V equivalent to a diode cathode and connecting the anode to the base of the transistor 174. This, however, promotes heat generation by the transistors 173 and 174. In such a case, as will be appreciated, the transistor 174 must be a PNP type, the emitter of a transistor 191 must be connected to the negative power source −V and the collector of the transistor 191 must be connected to the base of the transistor 174.

The current of the motor 12 and the chopper frequency are controlled by the network of the current detector 168, non-inverting Schmitt circuit 163, Miller integrator 166 and servo amplifier 167. The output of the voltage limiter 161 is supplied, in addition to the non-inverting amplifier 162 as mentioned, to an operational amplifier 192 of the non-inverting Schmitt circuit 163 through a resistor 193. Also supplied to the operational amplifier 192 through resistors 194 and 196 is a motor current detected by the current detector 168. Usually, the voltage differential between the two inputs of the operational amplifier 192 is so small that inversion of the operational amplifier 192 is not easy. This is assisted by a capacitor 197 and a resistor 198 which constitute a positive feedback path to the operational amplifier 192, and a capacitor 199 adapted to feed the output of the Miller integrator 166 back to the inverting input of the operational amplifier 192. The capacitor 197 and resistor 198 assist the operational amplifier 192 in producing an output upon change in the input signal. The capacitor 197 serves, after the output is generated, to hold the output against changes at the inverting input.

Since an operational amplifier 200 of the Miller integrator 163 produces a saw-toothed output wave having a usually constant gradient, the junction between resistors 201 and 202 connected to the inverting input of the operational amplifier 192 is maintained at a constant positive or negative voltage. The saw-toothed output of the operational amplifier 200, which is the input of the servo amplifier 162, is also adapted to protect output stage transistors 203 and 204 of the servo amplifier 167 from short-circuit current. As shown, the servo amplifier 167 does not have a resistor corresponding to the resistor 179 of the servo amplifier 164. This is to increase the gain of the servo amplifier 167. However, the aforementioned blind zone still exists. The large gain of the servo amplifier 167 is provided to suppress the transient heat loss of the transistors 203 and 204 which might otherwise be increased by the high frequency of the servo amplifier 167 and the saw-tooth input of the same. Diodes 206 and 207 connected between the collectors and emitters of the transistors 203 and 204 are generally known as flywheel diodes and become conductive in the event the EMF in the winding of the motor 12 is released.

The individual circuits generally operate as follows in response to positive and negative error signals. When the voltage of the error signal has increased from zero to a sufficiently high positive level, the output of the non-inverting amplifier 162 becomes positive and the transistors 186, 208 and 173 of the servo amplifier 164 are turned on. Thus, a positive voltage appears at the junction of the diodes 176 and 177 which is the output of the servo amplifier 164. Since the motor current cannot increase instantly due to the time constant, the current flowing through the resistor 193 at this stage is larger than the current through the resistor 196. Accordingly, the operational amplifier 192 of the non-inverting Schmitt circuit 163 produces a positive output and the operational amplifier 200 of the Miller integrator 166 produces a negative output. This turns on the transistors 209, 211 and 204 of the servo amplifier 167 and thereby causes a negative voltage to appear at the junction between the transistors 203 and 204 which is the output of the servo amplifier 167. At this instant, current flows from the positive power source +V to the negative power source −V through the transistor 173, diode 176, motor 12, a current detecting resistor 212 and transistor 204 in the order named. As the motor current progressively increases until the current through the resistor 196 exceeds the current through the resistor 193 the output level of the operational amplifier 192 of the Schmitt circuit 163 turns negative while the output of the operational amplifier 200 of the Miller integrator 8 increases towards the positive range. At the instant the output of the operational amplifier 200 rises beyond a given negative voltage, the transistors 209, 211 and 204 of the servo amplifier 167 become non-conductive. Current circulates from the positive power source +V back to the same through the transistor 173, diode 176, motor 12, current detecting resistor 212 and diode 206 in the order named. No energy is supplied from the power source and, instead, the EMF stored in the winding of the motor 12 is released progressively. In the event the current through the resistors 196 and 193 become out of balance, the transistors 209, 211 and 204 are again turned on so that energy is re-supplied from the power source to increase the motor current. Such a procedure will be repeated thereafter. The same holds true when the error signal is a negative voltage.

In a case where the error signal level is substantially zero as in the static operation of the motor 12, the voltage at the inverting input of the operational amplifier 192 automatically varies due to the self-running oscillator construction of the operational amplifiers 192 and 200. Hence, the amplifier network operates as if an error signal were present so that the motor 12 is forcibly supplied with positive and negative currents and locked in the target position without any oscillatory sound.

Figure 8:
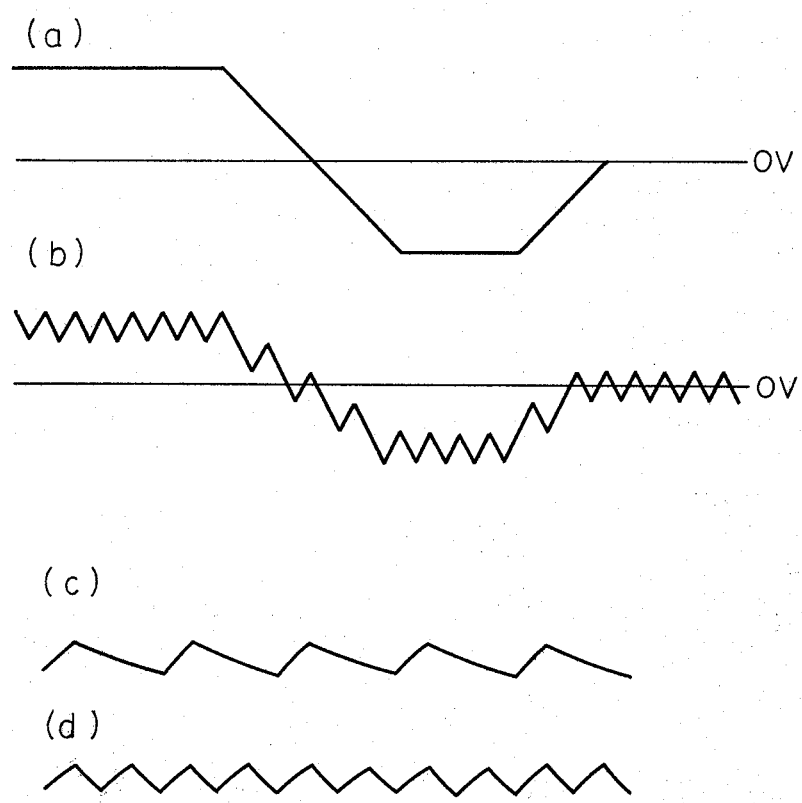
FIG. 8 is a graph illustrating the operation of the servo motor drive.

Waveforms of current appearing in various portions of the circuitry shown and described are depicted in FIG. 8. Waveform (a) indicates an output voltage of the voltage limiter 161 relative to an error signal and waveform (b) a motor current corresponding to the limiter output. Waveforms (c) and (d) show current in the static region and when the gain of the servo amplifier 164 is large and small, respectively.

In summary, an amplifier according to the present invention employs a self-running oscillator arrangement and performs a chopper action with a frequency above the audible range even when the error voltage is substantially zero as under static conditions of a servo motor. Hence, the present invention makes it unnecessary to prevent oscillatory sound such as by de-energizing the motor in the static range and, therefore, practically eliminates the need for a special motor without clicks whose static position is prevented from being displaced even when the motor is de-energized. Thus, the use of an ordinary motor is permitted.

In addition to the elements described above, the amplifier comprises resistors 221 to 242, diodes 244 to 249, capacitors 250 and 251, transistors 252 and 253 and operational amplifiers 254 and 255 connected as illustrated.

Figure 9:
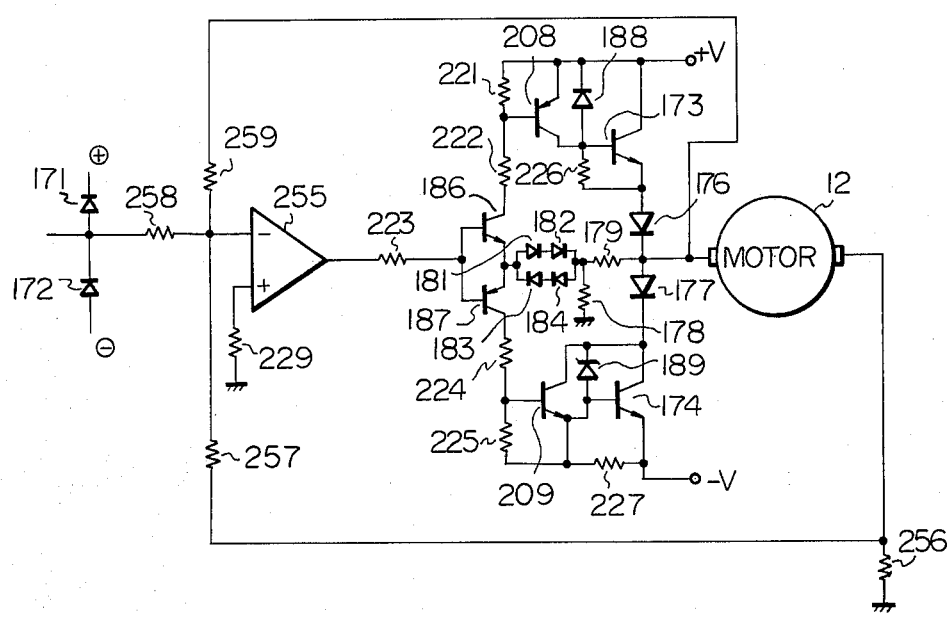
FIG. 9 is an electrical schematic diagram of an alternative servo motor drive in accordance with the present invention.

FIG. 9 illustrates the present invention as being embodied in a T type dropper amplifier. The detector 168, amplifier 167, Schmitt circuit 163 and Miller integrator 166 are omitted whereas the motor 12 is grounded through a resistor 256. The junction of the resistor 256 and motor 12 is connected in a feedback arrangement to the input of the operational amplifier 255 through a resistor 257. The non-grounded end of the motor 12 is connected to the inverting input of the amplifier 255 through a resistor 259 for summation. Further shown is a resistor 258 connected as illustrated.

In summary, it will be seen that the present invention overcomes the drawbacks of the prior art and provides a servo positioning apparatus comprising an improved servo amplifier which operates with increased efficiency and accuracy over the prior art. Various modifications will become possible for those skilled in the art after receiving the teachings of the present disclosure without departing from the scope thereof.

What is claimed is:

1. A servo positioning apparatus including a servo motor having a rotary shaft, transducer means for producing periodic signals in response to rotation of the shaft and computing means responsive to the periodic signals for computing a difference between a command motor shaft speed and an actual motor shaft speed and generating an error signal corresponding thereto, characterized by comprising:

drive means connected between the computing means and the motor for driving the motor in accordance with the error signal, the drive means comprising a first servo amplifier, a second servo amplifier, the motor being connected between outputs of the first and second servo amplifiers, an operational amplifier having a non-inverting input connected to the computing means for receiving the error signal, an inverting input connected to the output of the first servo amplifier and an output connected to an input of the first servo amplifier, current sensor means connected between the motor and the second servo amplifier for sensing motor current, Schmitt trigger means having a non-inverting input connected to an output of the current sensor and Miller integrator means having an input connected to an output of the Schmitt trigger means and an output connected to an inverting input of the Schmitt trigger means and to an input of the second servo amplifier, the Miller integrator means generating a sawtooth signal.

2. An apparatus as in claim 1, further comprising limiter means connected between the computing means and the operational amplifier for limiting the magnitude of the error signal to upper and lower limit values.

3. An apparatus as in claim 1, in which the first servo amplifier comprises first and second transistors having collector circuits connected in series between electric power sources of opposite polarities, a junction of the first and second transistors constituting the output of the first servo amplifier.

4. An apparatus as in claim 1, in which the second servo amplifier comprises first and second transistors having collector circuits connected in series between electric power sources of opposite polarities, a junction of the first and second transistors constituting the output of the second servo amplifier.

5. An apparatus as in claim 3, further comprising a first diode connected in series between the collector circuit of the first transistor and the junction and a second diode connected in series between the collector circuit of the second transistor and the junction.

6. An apparatus as in claim 5, further comprising a first Zener diode connected between a base of the first transistor and the respective electric power source and a second Zener diode connected between a base of the second transistor and a junction of the second diode and second transistor.

* * * * *